US009508339B2

(12) United States Patent
Kannan et al.

(10) Patent No.: US 9,508,339 B2
(45) Date of Patent: Nov. 29, 2016

(54) UPDATING LANGUAGE UNDERSTANDING CLASSIFIER MODELS FOR A DIGITAL PERSONAL ASSISTANT BASED ON CROWD-SOURCING

(71) Applicant: Microsoft Technology Licensing, LLC, Redmond, WA (US)

(72) Inventors: Vishwac Sena Kannan, Redmond, WA (US); Aleksandar Uzelac, Seattle, WA (US); Daniel J. Hwang, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 11 days.

(21) Appl. No.: 14/611,042

(22) Filed: Jan. 30, 2015

(65) Prior Publication Data

US 2016/0225370 A1    Aug. 4, 2016

(51) Int. Cl.
| | |
|---|---|
| *G06F 17/27* | (2006.01) |
| *G10L 15/06* | (2013.01) |
| *G06F 3/16* | (2006.01) |
| *G10L 15/00* | (2013.01) |
| *G10L 15/18* | (2013.01) |
| *G10L 15/22* | (2006.01) |

(52) U.S. Cl.
CPC ............ *G10L 15/063* (2013.01); *G06F 3/167* (2013.01); *G10L 15/005* (2013.01); *G10L 15/18* (2013.01); *G10L 15/22* (2013.01); *G10L 2015/0636* (2013.01); *G10L 2015/223* (2013.01)

(58) Field of Classification Search
CPC ...................................... G06F 17/02
USPC ........................ 704/1, 9, 10, 257, 270–275
See application file for complete search history.

(56) References Cited

U.S. PATENT DOCUMENTS

| 7,835,911 B2 | 11/2010 | Balchandran et al. |
| 7,917,363 B2 | 3/2011 | Starkie |
| 8,346,563 B1 | 1/2013 | Hjelm et al. |

(Continued)

FOREIGN PATENT DOCUMENTS

| EP | 1 760 610 | 3/2007 |
| WO | WO 2014/204659 | 12/2014 |

OTHER PUBLICATIONS

Guzzoni, et al., "Active: A Unified Platform for Building Intelligent Web Interaction Assistants", In IEEE/WIC/ACM International Conference on Web Intelligence and Intelligent Agent Technology, Dec. 2006, 4 pages.

(Continued)

*Primary Examiner* — Jesse Pullias
(74) *Attorney, Agent, or Firm* — Dan Choi; Micky Minhas

(57) ABSTRACT

A method for updating language understanding classifier models includes receiving via one or more microphones of a computing device, a digital voice input from a user of the computing device. Natural language processing using the digital voice input is used to determine a user voice request. Upon determining the user voice request does not match at least one of a plurality of pre-defined voice commands in a schema definition of a digital personal assistant, a GUI of an end-user labeling tool is used to receive a user selection of at least one of the following: at least one intent of a plurality of available intents and/or at least one slot for the at least one intent. A labeled data set is generated by pairing the user voice request and the user selection, and is used to update a language understanding classifier.

19 Claims, 11 Drawing Sheets

(56) References Cited

U.S. PATENT DOCUMENTS

| | | |
|---|---|---|
| 8,694,537 B2 | 4/2014 | Mohajer |
| 2002/0198714 A1* | 12/2002 | Zhou .................. G10L 15/1822 |
| | | 704/252 |
| 2004/0083092 A1* | 4/2004 | Valles ................ G06F 17/2785 |
| | | 704/9 |
| 2004/0199375 A1* | 10/2004 | Ehsani ............... G06F 17/2775 |
| | | 704/4 |
| 2008/0059178 A1 | 3/2008 | Yamamoto |
| 2009/0006343 A1* | 1/2009 | Platt .................. G06F 17/30389 |
| 2013/0152092 A1 | 6/2013 | Yadgar |
| 2013/0268260 A1 | 10/2013 | Lundberg et al. |
| 2014/0278355 A1 | 9/2014 | Sarikaya et al. |
| 2014/0365226 A1 | 12/2014 | Sinha |
| 2015/0032443 A1 | 1/2015 | Karov et al. |
| 2015/0142704 A1* | 5/2015 | London .................... G06N 5/04 |
| | | 706/11 |

OTHER PUBLICATIONS

"Speech Strategy News—Artificial Solutions' Natural Language Toolkit Interprets Text", Published on: Feb. 2012, Available at: http://www.tmaa.com/images/SSN224-0212.pdf.

International Search Report and Written Opinion, International Application No. PCT/US2016/013502, 20 pages, Oct. 4, 2016.

* cited by examiner

UPDATING LANGUAGE UNDERSTANDING CLASSIFIER MODELS FOR A DIGITAL PERSONAL ASSISTANT BASED ON CROWD-SOURCING

BACKGROUND

As computing technology has advanced, increasingly powerful mobile devices have become available. For example, smart phones and other computing devices have become commonplace. The processing capabilities of such devices have resulted in different types of functionalities being developed, such as functionalities related to digital personal assistants.

A digital personal assistant can be used to perform tasks or services for an individual. For example, the digital personal assistant can be a software module running on a mobile device or a desktop computer. Additionally, a digital personal assistant implemented within a mobile device has interactive and built-in conversational understanding to be able to respond to user questions or speech commands. Examples of tasks and services that can be performed by the digital personal assistant can include making phone calls, sending an email or a text message, and setting calendar reminders.

While a digital personal assistant may be implemented to perform multiple tasks using agents, programming/defining each reactive agent may be time consuming Therefore, there exists ample opportunity for improvement in technologies related to creating and editing reactive agent definitions and associated language understanding classifier models for implementing a digital personal assistant.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a method for updating language understanding classifier models may include receiving via one or more microphones of a computing device, a digital voice input from a user of the computing device. Input can also be received from a user using via other inputs as well (e.g., via text input or other types of input). Natural language processing is performed using the digital voice input to determine a user voice request. Upon determining the user voice request does not match at least one of a plurality of pre-defined tasks in an agent definition (e.g., an extensible markup language (XML) schema definition) of a digital personal assistant running on the computing device, a graphical user interface of an end-user labeling tool (EULT) of the computing device may be used to receive a user selection. A task may be defined by a voice (or text-entered) command, as well as by one or more additional means, such as through a rule-based engine, machine-learning classifiers, and so forth. The user selection may include at least one intent of a plurality of available intents for a domain. Optionally, the user selection may also include at least one slot for the at least one intent. The at least one intent is associated with at least one action used to perform at least one function of a category of functions for the domain. When included in the user selection, the at least one slot indicates a value used for performing the at least one action. A labeled data set may be generated by pairing (or otherwise associating) the user voice request with the user selection (e.g., selected domain, intent, and/or slot). A language understanding classifier may be selected from a plurality of available language understanding classifiers associated with the agent definition, the selecting based at least on the at least one intent selected by the user. The selected language understanding classifier may be updated based on the generated labeled data set.

In accordance with one or more aspects, a server computer that includes a processing unit and memory coupled to the processing unit. The server computer can be configured to perform operations for updating language understanding classifier models. The operations may include receiving from at least one computing device of a plurality of computing devices communicatively coupled to the server computer, a first user selection of at least one intent of a plurality of available intents. Optionally, the user selection may also include at least one slot for the at least one intent. When included in the user selection, the at least one intent may be associated with at least one action used to perform at least one function of a category of functions for a domain. The at least one slot may indicate a value used for performing the at least one action. The first user selection may be associated with a digital voice input received at the at least one computing device. A plurality of subsequent user selections that are identical to the first user selection may be received from at least another computing device of the plurality of computing devices. A labeled data set may be generated by pairing the digital voice input with the first user selection. A language understanding classifier may be selected from a plurality of available language understanding classifiers associated with one or more XML schema definitions, the selecting being based at least on one or more of the digital voice input, the domain, intent, and/or slot of the first user selection. The selected language understanding classifier may be updated based on the generated labeled data set.

In accordance with one or more aspects, a computer-readable storage medium may include instructions that upon execution cause a computing device to perform operations for updating language understanding classifier models. The operations may include determining a user request based on user input received at the computing device. The user request may be received via at least one of text input and voice input, and the request may be for a functionality of a digital personal assistant running on the computing device. The operations may further include determining that the user request does not match at least one of a plurality of pre-defined tasks (e.g., voice commands) in an extensible markup language (XML) schema definition of the digital personal assistant. In one implementation, a confidence score may be generated by applying a plurality of available language understanding classifiers associated with the XML schema definition to the user request. Upon determining that the confidence score is less than a threshold value, a user selection may be received using a graphical user interface of an end-user labeling tool (EULT) of the computing device. In another implementation, other methods may be used (e.g., in lieu of using a threshold value) to determine whether to use the EULT to receive a user selection of at least one of a domain, an intent and/or slot information. The user selection may include at least one intent of a plurality of available intents. Optionally, the user selection may include a domain and/or at least one slot for the at least one intent. The at least one intent is associated with at least one action used to perform at least one function of a category of functions for a domain. When included in the user selection, the at least one slot may indicate a value used for performing the at least one action. A labeled data set may be generated by pairing the user voice request and the user selection. A language understanding classifier may be selected from the plurality of available language understanding classifiers associated with the XML schema definition, with the selecting being based on the at least one intent and/or slot selected by the user. An updated language understanding classifier may be generated by training the selected language understanding classifier using the generated labeled data set (e.g., associating the classifier with the voice request and at least one of the domain, intent, and/or slot in the user selection).

As described herein, a variety of other features and advantages can be incorporated into the technologies as desired.

DETAILED DESCRIPTION

Figure 1:
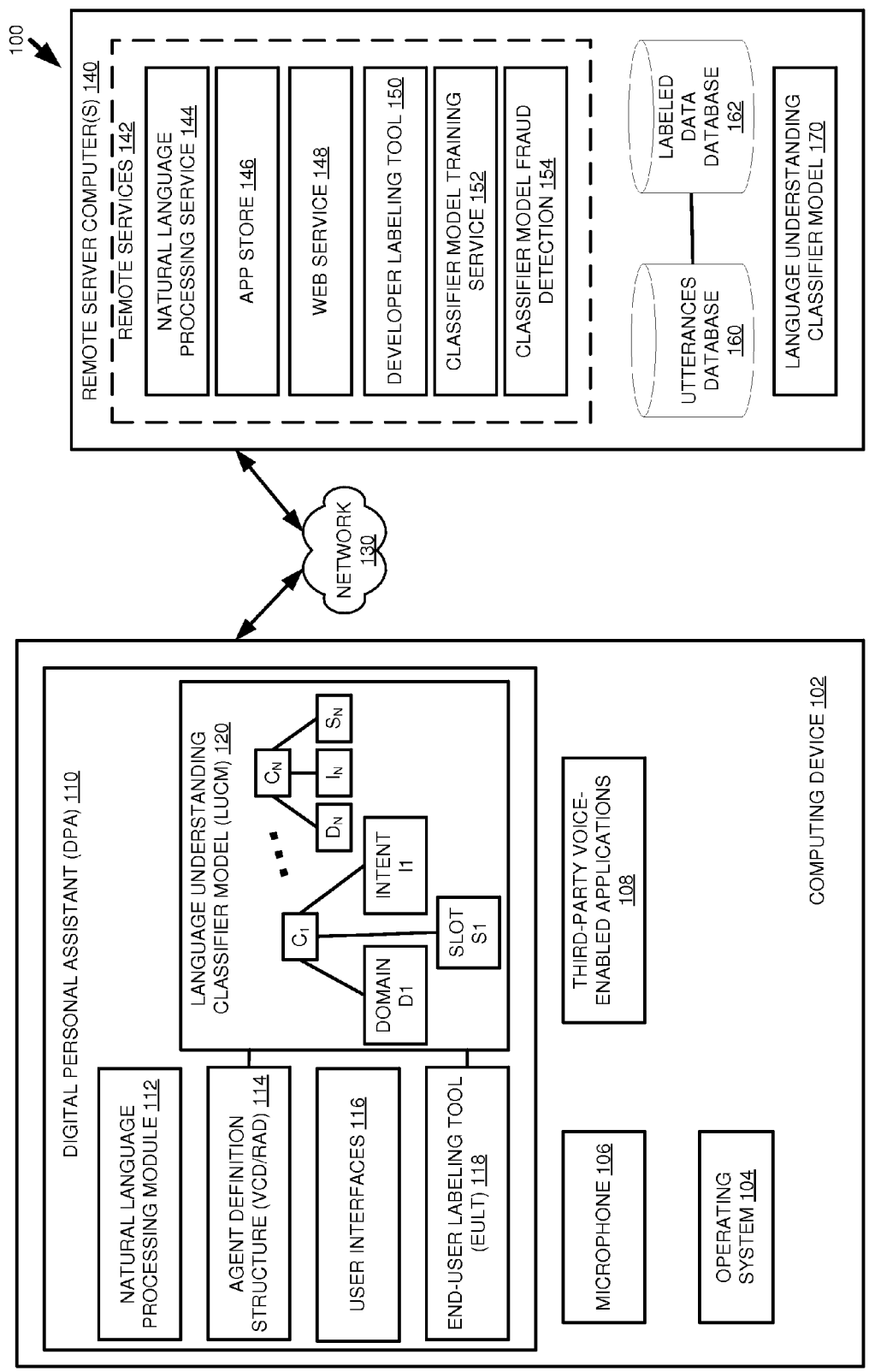
FIG. 1 is a block diagram illustrating an example architecture for updating language understanding classifier models, in accordance with an example embodiment of the disclosure.

As described herein, various techniques and solutions can be applied for updating language understanding classifier models. More specifically, an agent definition specification (e.g., a voice command definition (VCD) specification, a reactive agent definition (RAD) specification, or another type of a computer-readable document) may be used to define one or more agents associated with a digital personal assistant running on a computing device. The agent definition specification may specify domain information, intent information, slot information, state information, expected user utterances (or voice commands), state transitions, response strings and templates, localization information and any other information entered via the RADE to provide the visual/declarative representation of the reactive agent functionalities. The agent definition specification may implemented within a voice-enabled application (e.g., a digital personal assistant native to the device operating system or a third-party voice-enabled application) together with one or more language understanding classifiers (a definition of the term "classifier" is provided herein below). Each classifier can also be associated with one or more of a domain, intent, and slot, as well as with a user utterance.

In instances when a user utterance (or text input) does not match a specific utterance/command within the agent definition specification, an end-user labeling tool (EULT) may be used at the computing device to enable the user to select one or more of a domain, intent for the domain, and/or one or more slots for the intent. In instances when a domain is unavailable, the user may add a domain and, optionally, specify an intent and/or slot for that domain. A labeled data set can be created by associating the user utterance with the selected domain, intent, and/or slot. A classifier associated with the selected intent (and/or domain or slot) may then be updated using the labeled data set. The update to the classifier may be triggered only after a certain number of users make a substantially similar user selection (i.e., request the same or similar domain, intent and/or slot), to avoid fraudulent manipulation and update of a classifier. The update to the classifier can be done locally (within the computing device) and the updated classifier can then be stored in a cloud database where it can be used by other users. Alternatively, the user selection information may be sent to a server computer (cloud server) where the labeled data set can be created and the classifier updated after sufficient number of users perform the same (or similar) utterance and user selection.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. A second step is required to follow a first step only when the first step must be completed before the second step is begun. Such a situation will be specifically pointed out when not clear from the context. A particular step may be omitted; a particular step is required only when its omission would materially impact another step.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive—or is intended, such will be specifically noted (e.g., "either A or B", "at most one of A and B").

In this document, various computer-implemented methods, processes and procedures are described. It is to be understood that the various actions (receiving, storing, sending, communicating, displaying, etc.) are performed by a hardware device, even if the action may be authorized, initiated or triggered by a user, or even if the hardware device is controlled by a computer program, software, firmware, etc. Further, it is to be understood that the hardware device is operating on data, even if the data may represent concepts or real-world objects, thus the explicit labeling as "data" as such is omitted. For example, when the hardware device is described as "storing a record", it is to be understood that the hardware device is storing data that represents the record.

As used herein, the term "agent" or "reactive agent" refers to a data/command structure which may be used by a digital personal assistant to implement one or more response dialogs (e.g., voice, text and/or tactile responses) associated with a device functionality. The device functionality (e.g., emailing, messaging, etc.) may be activated by a user input (e.g., voice command) to the digital personal assistant. The reactive agent (or agent) can be defined using a voice agent definition (VAD), voice command definition (VCD), or a reactive agent definition (RAD) XML document (or another type of a computer-readable document) as well as programming code (e.g., C++ code) used to drive the agent through the dialog. For example, an email reactive agent may be used to, based on user tasks (e.g., voice commands), open a new email window, compose an email based on voice input, and send the email to an email address specified a voice input to a digital personal assistant. A reactive agent may also be used to provide one or more responses (e.g., audio/video/tactile responses) during a dialog session initiated with a digital personal assistant based on the user input.

As used herein, the term "XML schema" refers to a document with a collection of XML code segments that are used to describe and validate data in an XML environment. More specifically, the XML schema may list elements and attributes used to describe content in an XML document, where each element is allowed, what type of content is allowed, and so forth. A user may generate an XML file (e.g., for use in a reactive agent definition), which adheres to the XML schema.

As used herein, the term "domain" may be used to indicate a realm or range of personal knowledge and may be associated with a category of functions performed by a computing device. Example domains include email (e.g., an email agent can be used by a digital personal assistant (DPA) to generate/send email), message (e.g., a message agent can be used by a DPA to generate/send text messages), alarm (an alarm reactive agent can be used to set up/delete/modify alarms), and so forth.

As used herein, the term "intent" may be used to indicate at least one action used to perform at least one function of the category of functions for an identified domain. For example, "set an alarm" intent may be used for an alarm domain.

As used herein, the term "slot" may be used to indicate specific value or a set of values used for completing a specific action for a given domain-intent pair. A slot may be associated to one or more intents and may be explicitly provided (i.e., annotated) in the XML schema template. Typically, domain, intent and one or more slots make a language understanding construct, however within a given agent scenario, a slot could be shared across multiple intents. As an example, if the domain is alarm with two different intents—set an alarm and delete an alarm, then both these intents could share the same "alarmTime" slot. In this regard, a slot may be connected to one or more intents.

As used herein, the term "user selection" (in connection with the end-user labeling tool) refers to a selection by the user of domain and/or intent and/or slot information. In this regard, an individual selection of a domain or an intent or a slot is possible (e.g., only intent can be selected), as well as any pairings (e.g., selection of domain-intent and no slot).

As used herein, the term "classifier" or "language understanding classifier" refers to a statistical, rule-based or machine learning-based algorithm or software implementation that can map a given user input (speech or text) to a domain and intent. The algorithm also might output a confidence score for any classification being performed using the classifier. The same algorithm or a subsequent piece of software can then infer/determine the set of slots specified by the user as part of the utterance for that domain-intent pair. A given user utterance can train multiple classifiers—some for the positives case and others for the negative case. As an example, a user utterance (or a voice/text command) "message Rob I'm running late" could be used to train a "messaging" classifier as a positive training set, and the "email" classifier as a negative training set. A classifier can be associated with one or more parts of labelled data (e.g., the user utterance, domain, intent, and/or slot).

FIG. 1 is a block diagram illustrating an example architecture (100) for updating language understanding classifier models, in accordance with an example embodiment of the disclosure. Referring to FIG. 1, a client computing device (e.g., smart phone or other mobile computing device such as device 800 in FIG. 8) can execute software organized according to the architecture 100 to provide updating of language understanding classifier models.

The architecture 100 includes a computing device 102 (e.g., a phone, tablet, laptop, desktop, or another type of computing device) coupled to a remote server computer (or computers) 140 via network 130. The computing device 102 includes a microphone 106 for converting sound to an electrical signal. The microphone 106 can be a dynamic, condenser, or piezoelectric microphone using electromagnetic induction, a change in capacitance, or piezoelectricity, respectively, to produce the electrical signal from air pressure variations. The microphone 106 can include an amplifier, one or more analog or digital filters, and/or an analog-to-digital converter to produce a digital sound input. The digital sound input can comprise a reproduction of the user's voice, such as when the user is commanding the digital personal assistant 110 to perform a task.

The digital personal assistant 110 runs on the computing device 102 and allows the user of the computing device 102 to perform various actions using voice (or text) input. The digital personal assistant 110 can comprise a natural language processing module 112, an agent definition structure 114, user interfaces 116, language understanding classifier model (LUCM) 120, and a end-user labeling tool (EULT) 118. The digital personal assistant 110 can receive user voice input via the microphone 106, determine a corresponding task (e.g., a voice command) from the user voice input using the agent definition structure 114 (e.g., a voice command data structure or a reactive agent definition structure), and perform the task (e.g., voice command). In some situations, the digital personal assistant 110 sends the user (voice or text) command to one of the third-part voice-enabled applications 108. In other situations, the digital personal assistant 110 handles the task itself.

The device operating system (OS) 104 manages user input functions, output functions, storage access functions, network communication functions, and other functions for the device 110. The device OS 104 provides access to such functions to the digital personal assistant 110.

The agent definition structure 114 can define one or more agents of the DPA 110 and can specify tasks or commands (e.g., voice commands) supported by the DPA 110 and/or the third-party voice-enabled applications 108 along with associated voice command variations and voice command examples. In some implementations, the agent definition structure 114 is implemented in an XML format. Additionally, the agent definition structure 114 can identify voice-enabled applications available remotely from an app store 146 and/or voice-enabled services available remotely from a web service 148 (e.g., by accessing a scheme definition available from the remote server computers 140 that defines the capabilities for the remote applications and/or the remote services).

The agent definition structure 114 can be provided together with the language understanding classifier model (LUCM) 120 (e.g., as part of the operating system 104 or can be installed at the time the DPA 110 is installed). The LUCM 120 can include a plurality of classifiers C1, . . . , Cn, where each classifier can be associated with one or more of a domain (D1, . . . , Dn), intent (I1, . . . , In) and/or a slot (S1, . . . , Sn). Each of the classifiers can include a statistical, rule-based or machine learning-based algorithm or software implementation that can map a given user input (speech or text) to a domain and intent. The algorithm also might output a confidence score for any classification being performed using the classifier. In some implementations, a classifier can be associated with one or more of a domain, intent, and/or slot information and may provide a confidence score when applied to a given user voice/text input (example implementation scenario is described in reference to FIG. 2).

Even though LUCM 120 is illustrated as being part of the DPA 110 together with the agent definition structure 114, the present disclosure is not limited in this regard. In some embodiments, the LUCM 120 may be a local copy of a classifier model, which includes classifiers (C1, . . . , Cn) that are relevant to the agent definition structure 114 and the DPA 110. Another (e.g., global) classifier model (e.g., LUCM 170) may be stored in the cloud (e.g., as part of the server computers 140). The global LUCM 170 may be used at the time an agent definition structure is created so that a subset of (e.g., relevant) classifiers can be included with such definition structure and implemented as part of an app (e.g., third-party app 108, the DPA 110, and/or the OS 104).

The DPA 110 can process user voice input using a natural language processing module 112. The natural language processing module 112 can receive the digital sound input and translate words spoken by a user into text using speech recognition. The extracted text can be semantically analyzed to determine a task (e.g., a user voice command). By analyzing the digital sound input and taking actions in response to spoken commands, the digital personal assistant 110 can be controlled by the voice input of the user. For example, the digital personal assistant 110 can compare extracted text to a list of potential user commands (e.g., stored in the agent definition structure 114) to determine the command mostly likely to match the user's intent. The DPA 110 may also apply one or more of the classifiers from LUCM 120 to determine a confidence score, select a classifier based on the confidence score, and determine a command most likely to match the user's intent based on the command (or utterance) associated with the classifier. In this regard, the match can be based on statistical or probabilistic methods, decision-trees or other rules, other suitable matching criteria, or combinations thereof. The potential user commands can be native commands of the DPA 110 and/or commands defined in the agent definition structure 114. Thus, by defining commands in the agent definition structure 114 and the classifiers within the LUCM 120, the range of tasks that can be performed on behalf of the user by the DPA 110 can be extended. The potential commands can also include voice commands for performing tasks of the third-party voice-enabled applications 108.

The digital personal assistant 110 includes voice and/or graphical user interfaces 116. The user interfaces 116 can provide information to the user describing the capabilities of the DPA 110 (e.g., capabilities of the EULT 118) and/or the third-party voice-enabled applications 108.

Figure 2:
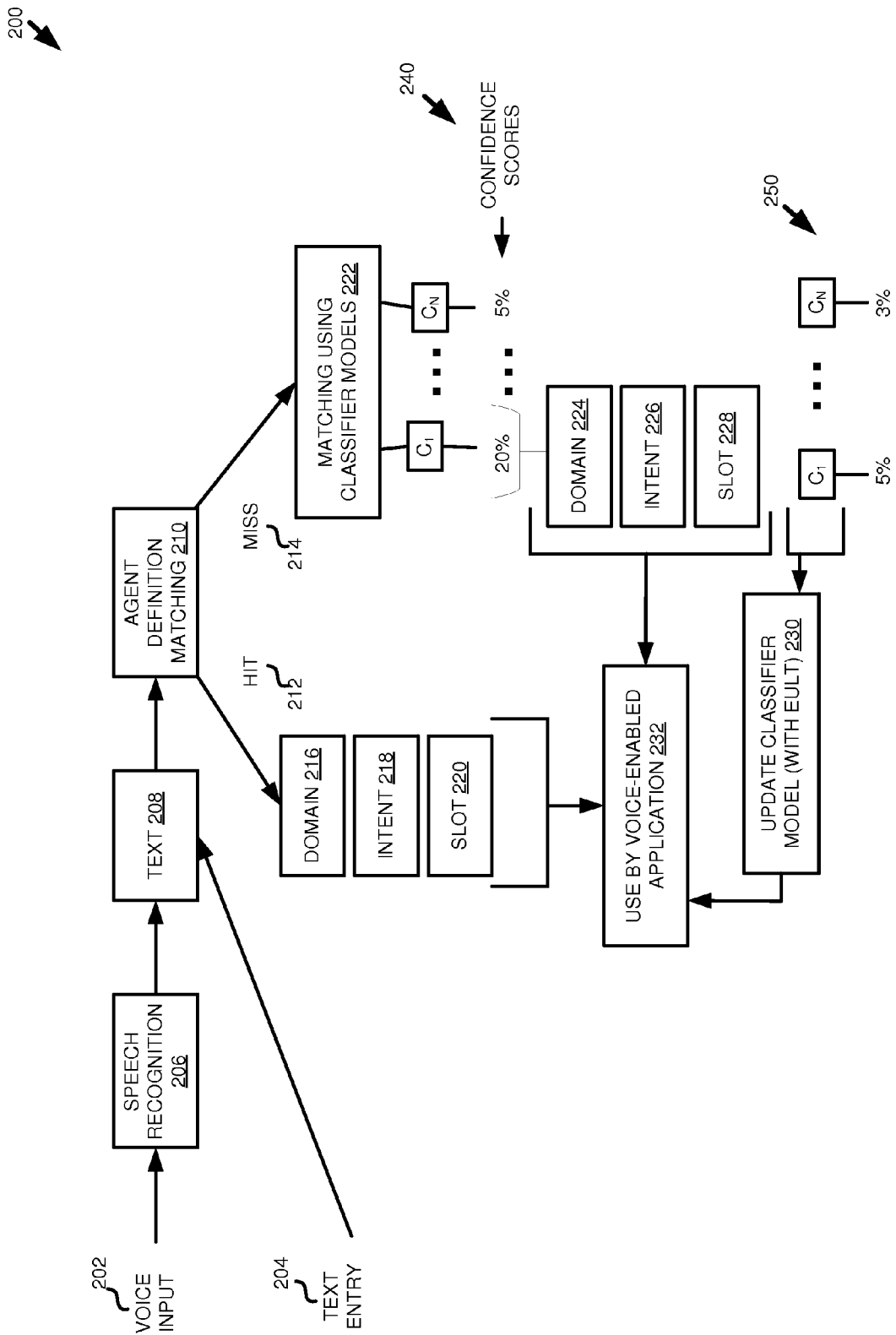
FIG. 2 is a block diagram illustrating various uses of language understanding classifiers by voice-enabled applications, in accordance with an example embodiment of the disclosure.

The end-user labeling tool (EULT) 118 may comprise suitable logic, circuitry, interfaces, and/or code and may be operable to provide functionalities for updating language understanding classifier models, as described herein. For example, the EULT 118 may be triggered in instances when the agent definition structure 114 does not have a voice command string that matches the user's voice/text command or one or more of the available classifiers return a confidence score that is below a threshold amount (as seen in FIG. 2). The user may then use the EULT 118 to select a domain, intent and/or slot, and associate a task (e.g., a voice command expressed as utterance) or text command with the user-selected domain, intent and/or slot information. The user selections and the user-entered voice/text command may be sent to the server computers 140, where the global classifier set 170 may be updated (e.g., a classifier that matches the user voice/text command is updated with the user-entered domain, intent, and/or slot). In this regard, crowd-sourcing approach may be used to train/label classifiers and, therefore, improve the global and local LUCM (170 and 120).

The digital personal assistant 110 can access remote services 142 executing on the remote server computers 140. Remote services 142 can include software functions provided at a network address over a network, such as a network 130. The network 130 can include a local area network (LAN), a Wide Area Network (WAN), the Internet, an intranet, a wired network, a wireless network, a cellular network, combinations thereof, or any network suitable for providing a channel for communication between the computing device 102 and the remote server computers 140. It should be appreciated that the network topology illustrated in FIG. 1 has been simplified and that multiple networks and networking devices can be utilized to interconnect the various computing systems disclosed herein.

The remote services 142 can include various computing services that are accessible from the remote server computers 140 via the network 130. The remote services 142 can include a natural language processing service 144 (e.g., called by the digital personal assistant 110 to perform, or assist with, natural language processing functions of the module 112). The remote services 142 can include an app store 146 (e.g., an app store providing voice-enabled applications that can be searched or downloaded and installed). The remote services 142 can also include web services 148 which can be accessed via voice input using the digital personal assistant 110. The remote services 142 can also include a developer labeling tool 150, a classifier model training service 152 and classifier model fraud detection service 154, as explained herein below. The remote server computers 140 can also manage an utterances database 160 and labeled data database 162.

FIG. 2 is a block diagram 200 illustrating various uses of language understanding classifiers by voice-enabled applications, in accordance with an example embodiment of the disclosure. Referring to FIGS. 1-2, a user (e.g., user of device 102) may enter a voice input 202. Speech recognition block 206 (e.g., 112) may convert the speech of input 202 into a user command (text) 208. The user command 208 may, alternatively, be entered as text entry 204. At block 210, agent definition matching may be performed by matching the user command 208 with one or more user commands specified in the agent definition structure (e.g., 114). If there is a direct match (at 212), then domain 216, intent 218 and/or slot 220 may be inferred from the matched user command, and such information may be used by the DPA 110 and/or app 108) at block 232. If, however, there is no match (at 214), then matching using the LUCM 120 (or 170) can be performed.

More specifically, the user command 208 may be used as input into the classifiers C1, . . . , Cn, and corresponding confidence scores 240 may be calculated. If for a given classifier (e.g., C1) the confidence score is greater or equal to a threshold value (e.g., 20%), then the classifier can be used to extract the domain 224, intent 226, and/or slot 228 associated with such classifier. The extracted domain/intent/slot can be used by the DPA 110 or app 108 (at 230). If the confidence score, however, is lower than the threshold (e.g., at 250), then the classifier model can be updated (e.g., using the EULT 118 and as seen in FIGS. 3B-4B). The domain, intent, and/or slot determined during the EULT labeling process can be used by the DPA 110 and/or app 108 (at 232).

Even though a confidence score generated by the classifiers is used (together with a threshold value) to determine whether to use the EULT to obtain a user selection, the present disclosure is not limiting in this regard. In another implementation, other methods may be used (e.g., in lieu of using a threshold value) to determine whether to use the EULT to receive a user selection of at least one of a domain, an intent and/or slot information.

Figure 3A:
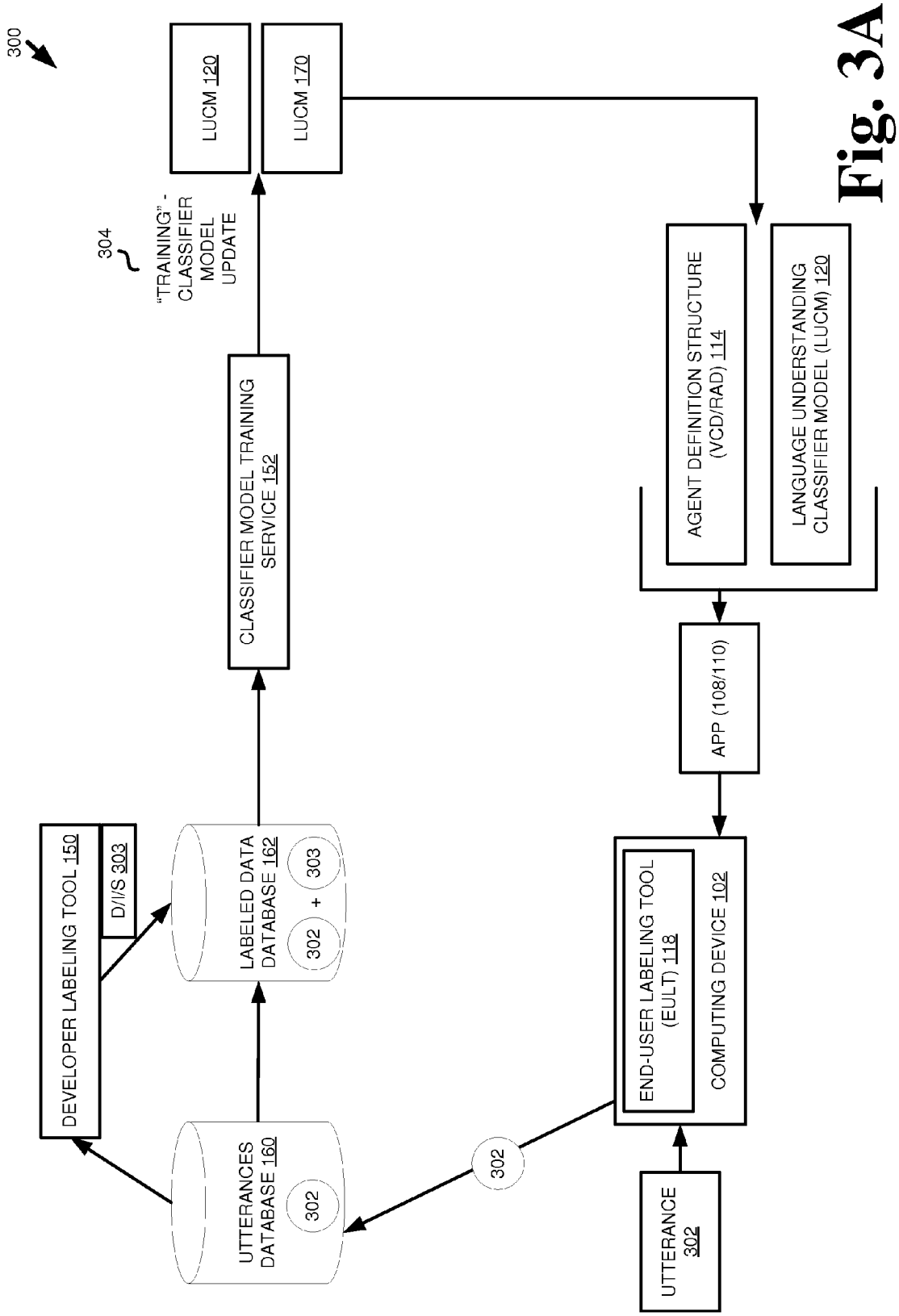
FIGS. 3A-3B illustrate example processing cycles for updating language understanding classifier models, in accordance with an example embodiment of the disclosure.
Figure 3B:
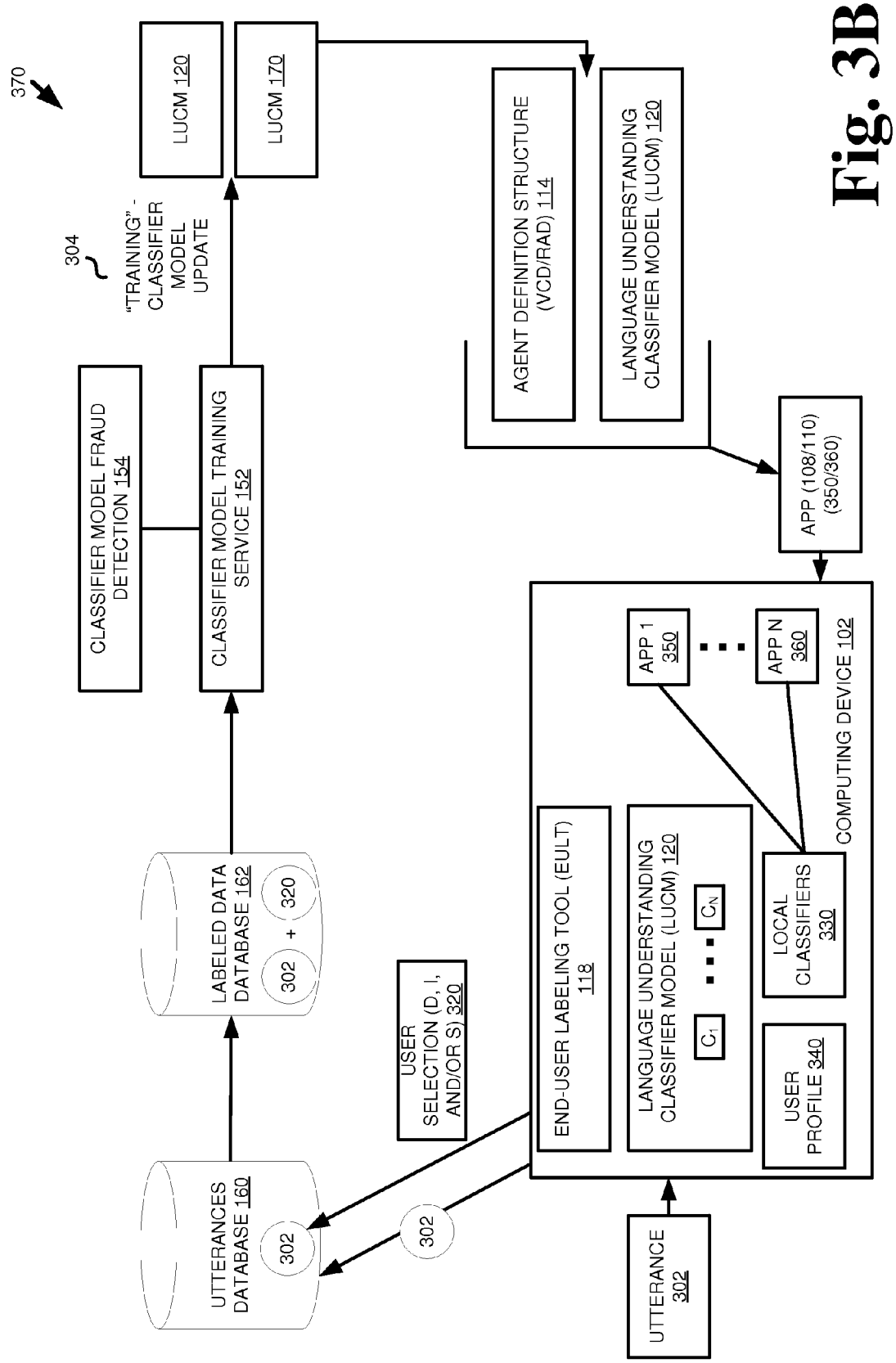

FIGS. 3A-3B illustrate example processing cycles for updating language understanding classifier models, in accordance with an example embodiment of the disclosure. Referring to FIG. 3A, there is illustrated architecture 300 for training/updating classifier data using a developer labeling tool 150. As seen in FIG. 3A, an agent definition structure 114 may be bundled with the LUCM 120 (LUCM 120 can be the same as, or a subset of, the LUCM 170). The agent definition structure 114 and the LUCM 120 can then be implemented as part of the app 108 (e.g., as available in the app store 146) or the DPA 110. The app 108 (and the DPA 110) may then be installed in the device 102.

In instances when the EULT 118 is disabled, a user may provide an utterance 302 (e.g., user command). The utterance may be communicated and stored as part of the utterances database 160, which may also store utterances from users of other computing devices communicatively coupled to the server computers 140. A network administrator/developer may then use the developer labeling tool 150 to retrieve an utterance (e.g., 302) from the database 160, and generated a domain, intent, and/or slot selection 303. The administrator selection 303 can be bundled with the utterance 302 and stored as labeled data within the labeled data database 162. The administrator may then pass the labeled data along to the classifier training service 152 (or the labeled data may be automatically communicated to the training service 152 upon being stored in the database 162).

The classifier model training service 152 may comprise suitable logic, circuitry, interfaces, and/or code and may be operable to perform training (or updating) of one or more classifiers within the LUCMs 120 and/or 170. During example classifier training 304, the labeled data set can be retrieved (e.g., 302 and 303); the domain, intent and/or slot information (e.g., 303) can be used (e.g., as an index) to access the LUCM 120/170 and retrieve a classifier that is associated with such domain, intent and/or slot. The training service 152 can then update the classifier so that it is associated with the user utterance/command (302) as well as one or more of the domain, intent and/or slot (303) provided by the administrator using the developer labeling tool 150. The updated LUCM 120 can then be used and be bundled with an agent definition structure for implementation in an app.

Referring to FIG. 3B, there is illustrated architecture 370 for training/updating classifier data using an end-user labeling tool (EULT) 118. As seen in FIG. 3B, an agent definition structure 114 may be bundled with the LUCM 120 (LUCM 120 can be the same as, or a subset of, the LUCM 170). The agent definition structure 114 and the LUCM 120 can then be implemented as part of the app 108 (e.g., as available in the app store 146), the DPA 110, and/or apps 350, . . . , 360. The apps 108, 350, . . . , 360 (and the DPA 110) may then be installed in the device 102.

In instances when the EULT 118 is enabled, a user may provide an utterance 302 (e.g., user command). The utterance may be communicated and stored as part of the utterances database 160, which may also store utterances from users of other computing devices communicatively coupled to the server computers 140. The user of device 102 may then use the EULT 118 to provide user input, selecting one or more of a domain, intent and/or slot associated with the utterance/command 302 (this is assuming there is no direct match (e.g., 212) with a command within the agent definition structure 114, and there is no confidence score that is above a threshold value (e.g., 240)).

The user may use the EULT 118 to select a domain, intent and/or slot (e.g., 320) associated with the utterance 302. The DPA 110 (or otherwise the device 102) may select at least one of the classifiers C1, . . . , Cn within the LUCM 120 as matching the entered user selection 320 (e.g., a classifier may be selected from the LUCM 120 based on matching domain, intent and/or slot information associated with the classifier with the domain, intent, and/or slot information of the user selection 320 entered via the EULT 118).

In accordance with an example embodiment of the disclosure, after a matching classifier is retrieved from LUCM 120, the device 102 may update the classifier (e.g., as discussed above in reference to 304) and store the updated/trained classifier as a local classifier 330. the training and update of the classifier and generating the local classifier 330 can be performed by using the classifier model training service 152 of remote server computers 140. In this regard, one or more local classifiers 330 may be generated, without such trained classifiers be present in the global LUCM 170. The local classifiers 330 may be associated with a user profile 340, and may be used/shared between one or more of the apps 350, . . . , 360 installed on device 102. Optionally, the local classifiers 330 may be stored in the server computers 140, as part of the user profile 340 (a profile may also be stored in the server computers 140, together with other profile/user account information).

The DPA 110 may also communicate the user-selected domain, intent and/or slot information 320 together with the utterance 302, for storage as labeled data within the labeled data database 162. The labeled data may then be passed along to the classifier training service 152 for training. In accordance with an example embodiment of the disclosure, a classifier model fraud detection service 154 may be used in connection with the training service 152. More specifically, the fraud detection service 154 may comprise suitable logic, circuitry, interfaces, and/or code and may be operable to prevent classifier training/update unless a certain minimum number (threshold) of users have requested the same (or substantially similar) update to a classifier associated with the same (or substantially similar) user utterance. In this regard, an automatic classifier update can be prevented in instances when a user tries to associate a task (e.g., an utterance to express a voice command) with a domain, intent, and/or slot that most of the other remaining users in the system do not associate such utterance with.

Assuming a minimum number of users have requested the same or substantially similar update to a classifier, then the training/update (304) of the classifier can proceed, as previously discussed in reference to FIG. 3A. During example classifier training 304, the labeled data set can be retrieved (e.g., 302 and 303); the domain, intent and/or slot information (e.g., 303) can be used (e.g., as an index) to access the LUCM 120/170 and retrieve a classifier that is associated with such domain, intent and/or slot. The training service 152 can then update the classifier so that it is associated with the user utterance/command (302) as well as one or more of the domain, intent and/or slot (303) provided by the administrator using the developer labeling tool 150. The updated LUCM 120 can be used and bundled with an agent definition structure for implementation in an app.

Figure 4A:
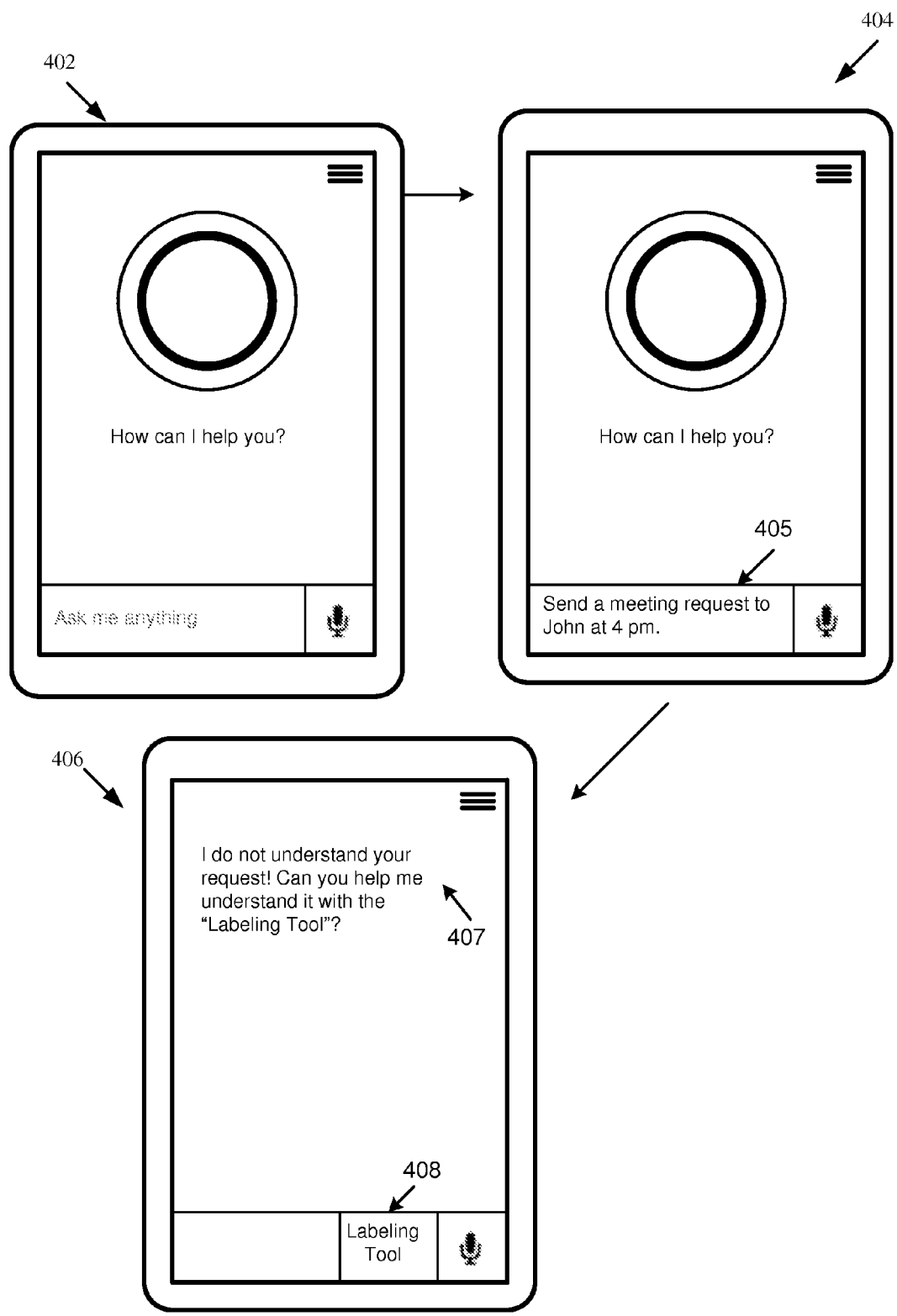
FIGS. 4A-4B illustrate example user interfaces of an end-user labeling tool, which may be used in accordance with an example embodiment of the disclosure.
Figure 4B:
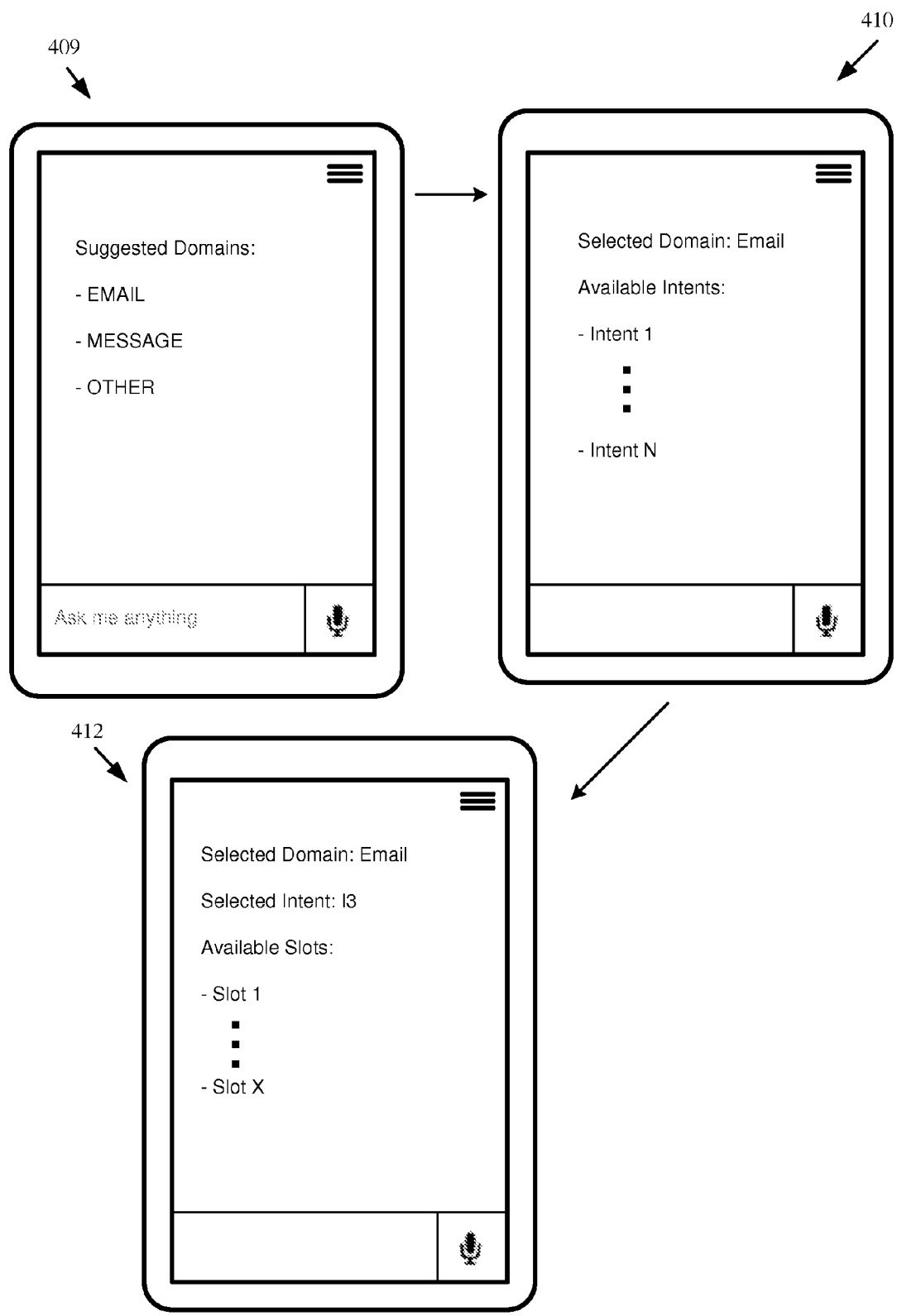

FIGS. 4A-4B illustrate example user interfaces of an end-user labeling tool, which may be used in accordance with an example embodiment of the disclosure. Referring to FIG. 4A, the user interface at 402 illustrates an initial view of a DPA 110 prompting the user to provide a task (e.g., a voice command). At 404, the user provides a voice command at 405. At 406, the DPA 110 may have performed processing (e.g., 202-214) and may have determined that there is no matching user command in the agent definition structure 114 or a sufficiently high confidence score (240). Processing then continues (e.g., at 250) by activating the EULT 118 interface. At 407, the DPA 110 notifies user that the task (e.g., voice command) is unclear and asks whether the user would like to activate the "Labeling Tool" (EULT 118). The user then activates EULT 118 by pressing software button 408.

Referring to FIG. 4B, the user interface at 409 suggests one or more domains so the user can select a relevant domain for their task (e.g., voice command). One or more domains can be listed (e.g., one or more domains relevant (e.g., phonetically similar) to the task (or voice command) or all domains available in the system). After the user selects a domain, the user interface 410 can be used to list one or more intents associated with the selected domain. Alternatively, all available intents may be listed for the user to choose from. After the user selects an intent, the user interface 412 can be used to list one or more slots associated with the selected intent. Alternatively, all available slots may be listed for the user to choose from. After selecting the slot, the domain, intent, and/or slot information 320 may be further processed as described above.

Figure 5:
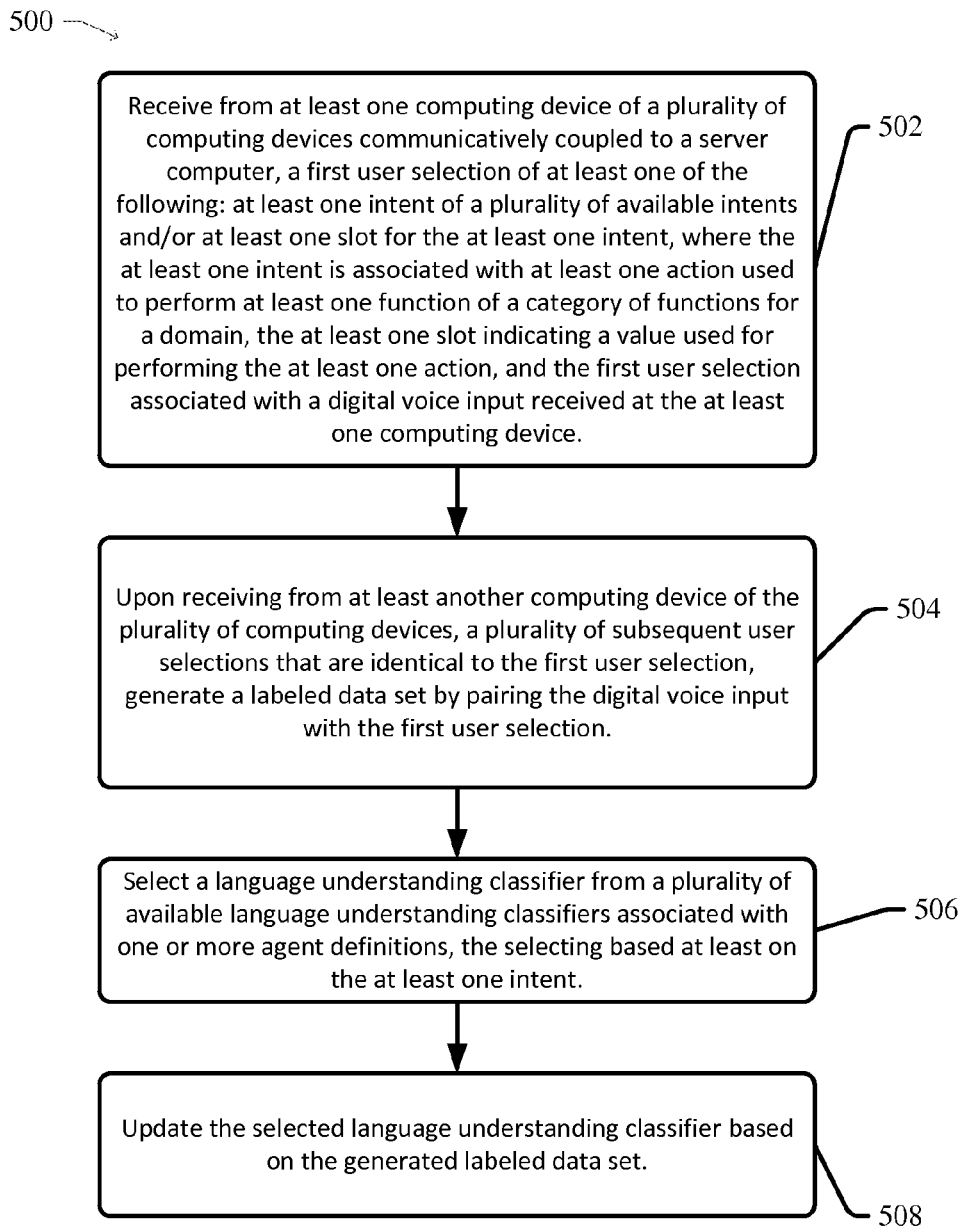
FIGS. 5-7 are flow diagrams illustrating updating language understanding classifier models, in accordance with one or more embodiments.
Figure 6:
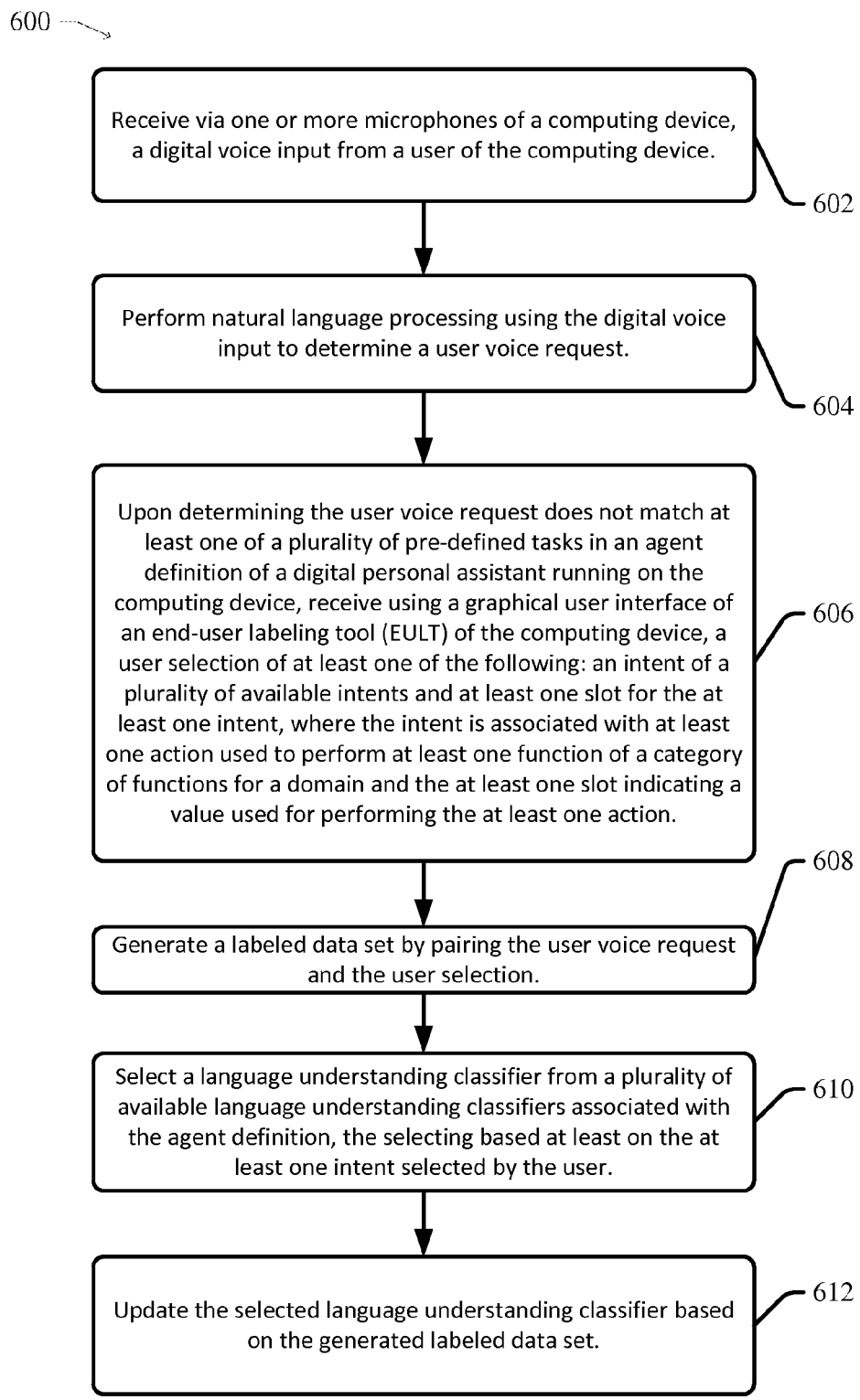
Figure 7:
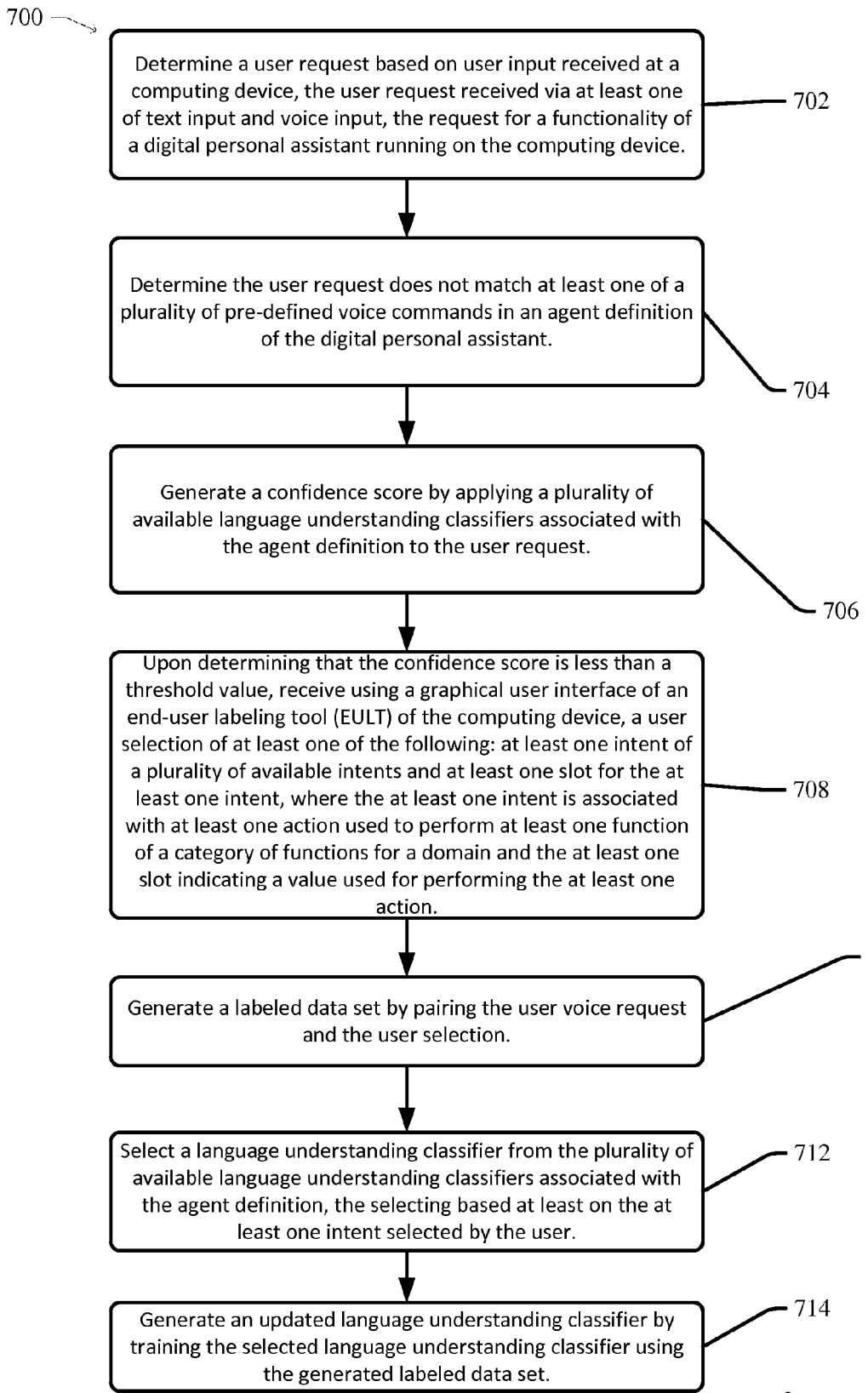

FIGS. 5-7 are flow diagrams illustrating generating of a reactive agent definition, in accordance with one or more embodiments. Referring to FIGS. 1-5, the example method 500 may start at 502, when a first user selection (320) of at least one of the following: at least one intent of a plurality of available intents and/or at least one slot for the at least one intent may be received from at least one computing device (e.g., 102) of a plurality of computing devices communicatively coupled to a server computer (e.g., 140). The at least one intent (intent in user selection 320) is associated with at least one action used to perform at least one function of a category of functions for a domain. The at least one slot (e.g., within user selection 320) indicates a value used for performing the at least one action. The first user selection (320) is associated with a digital voice input (e.g., utterance 302) received at the at least one computing device (102). At 504, upon receiving from at least another computing device of the plurality of computing devices, a plurality of subsequent user selections that are identical to the first user selection, a labeled data set is generated by pairing the digital voice input with the first user selection. For example, after 302 and 320 are paired to generate the labeled data set, the training service 152 may proceed with training of the corresponding classifier after a certain (threshold) number of other users submits the same (or substantially similar) user selection and utterance. At 506, the classifier model training service 152 may select a language understanding classifier from a plurality of available language understanding classifiers (e.g., from LUCM 170) associated with one or more agent definitions. The selecting may be based at least on the at least one intent. At 508, the training service 152 may update the selected language understanding classifier based on the generated labeled data set.

Referring to FIGS. 1-3B and 6, the example method 600 may start at 602, when a digital voice input (302) from a user of the computing device (102) may be received via one or more microphones (106) of a computing device (102). At 604, the natural language processing module 112 may perform natural language processing using the digital voice input to determine a user voice request. At 606, upon determining the user voice request does not match (e.g., 214) at least one of a plurality of pre-defined voice commands in an agent definition (e.g., 114) of a digital personal assistant (110) running on the computing device, a user selection (320) of at least one of the following: an intent of a plurality of available intents and at least one slot for the at least one intent may be received using a graphical user interface of an end-user labeling tool (EULT) (118) of the computing device (102). The intent is associated with at least one action used to perform at least one function of a category of functions for a domain and the at least one slot indicating a value used for performing the at least one action. At 608, the DPA 110 may generate a labeled data set by pairing the user voice request (320) and the user selection (302). At 610, the DPA 110 (or device 102) may select a language understanding classifier from a plurality of available language understanding classifiers (e.g., C1, . . . , Cn in LUCM 120) associated with the agent definition (e.g., 114). The selecting of the classifier can be based at least on the at least one intent selected by the user using the EULT 118. At 612, the DPA 110 (or device 102) may update the selected language understanding classifier based on the generated labeled data set (e.g., based on 302 and 320, creating the local classifier 330).

Referring to FIGS. 1-3B and 7, the example method 700 may start at 702, when a user request may be determined based on user input (302) received at a computing device (102). The user request can be received via at least one of text input (204) and/or voice input (202), the request being for a functionality of a digital personal assistant (110) running on the computing device. At 704, the DPA 110 (or device 102) may determine the user request does not match at least one of a plurality of pre-defined tasks (e.g., voice commands) in an agent definition (114) of the digital personal assistant (e.g., 214).

At 706, the DPA 110 (or device 102) may generate a confidence score (240) by applying a plurality of available language understanding classifiers (C1, . . . , Cn) associated with the agent definition to the user request (208). At 708, upon determining that the confidence score is less than a threshold value (250), the DPA 110 receives using a graphical user interface of an end-user labeling tool (EULT) (118) of the computing device, a user selection (320) of at least one of the following: at least one intent of a plurality of available intents and at least one slot for the at least one intent. The at least one intent is associated with at least one action used to perform at least one function of a category of functions for a domain and the at least one slot indicating a value used for performing the at least one action.

At 710, the DPA 110 (or device 102) generates a labeled data set by pairing the user voice request (302) and the user selection (320). At 712, the DPA 110 (or device 102) selects a language understanding classifier from the plurality of available language understanding classifiers (LUCM 120)

associated with the agent definition, the selecting based at least on the at least one intent selected by the user. At 714, the DPA 110 (or device 102) generates an updated language understanding classifier by training the selected language understanding classifier using the generated labeled data set (e.g., generating a local classifier 330).

Figure 8:
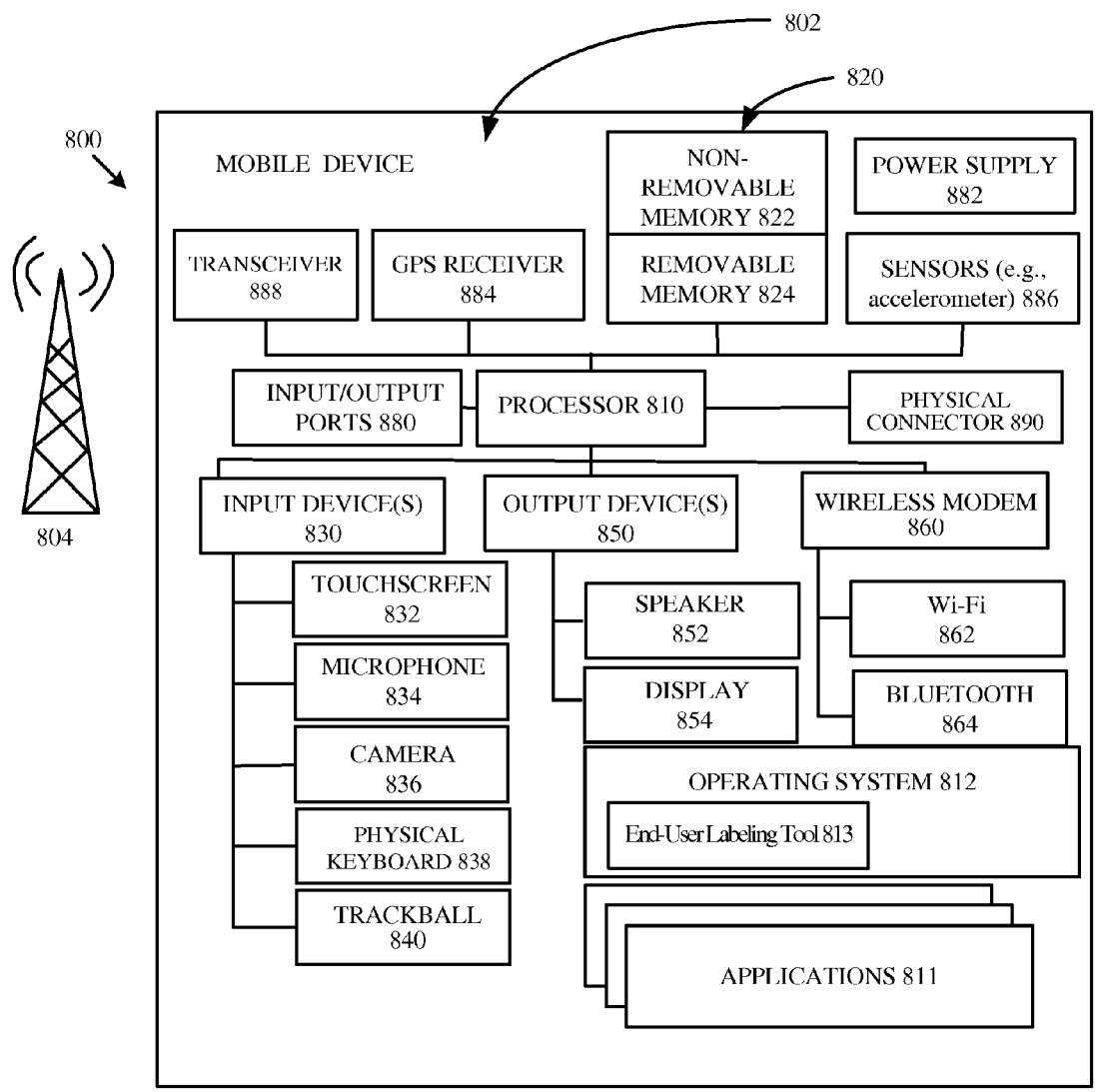
FIG. 8 is a block diagram illustrating an example mobile computing device in conjunction with which innovations described herein may be implemented.

FIG. 8 is a block diagram illustrating an example mobile computing device in conjunction with which innovations described herein may be implemented. The mobile device 800 includes a variety of optional hardware and software components, shown generally at 802. In general, a component 802 in the mobile device can communicate with any other component of the device, although not all connections are shown, for ease of illustration. The mobile device 800 can be any of a variety of computing devices (e.g., cell phone, smartphone, handheld computer, laptop computer, notebook computer, tablet device, netbook, media player, Personal Digital Assistant (PDA), camera, video camera, etc.) and can allow wireless two-way communications with one or more mobile communications networks 804, such as a Wi-Fi, cellular, or satellite network.

The illustrated mobile device 800 includes a controller or processor 810 (e.g., signal processor, microprocessor, ASIC, or other control and processing logic circuitry) for performing such tasks as signal coding, data processing (including assigning weights and ranking data such as search results), input/output processing, power control, and/or other functions. An operating system 812 controls the allocation and usage of the components 802 and support for one or more application programs 811. The operating system 812 may include an end-user labeling tool 813, which may have functionalities that are similar to the functionalities of the EULT 118 described in reference to FIGS. 1-7.

The illustrated mobile device 800 includes memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in Global System for Mobile Communications (GSM) communication systems, or other well-known memory storage technologies, such as "smart cards." The memory 820 can be used for storing data and/or code for running the operating system 812 and the applications 811. Example data can include web pages, text, images, sound files, video data, or other data sets to be sent to and/or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 800 can support one or more input devices 830, such as a touch screen 832 (e.g., capable of capturing finger tap inputs, finger gesture inputs, or keystroke inputs for a virtual keyboard or keypad), microphone 834 (e.g., capable of capturing voice input), camera 836 (e.g., capable of capturing still pictures and/or video images), physical keyboard 838, buttons and/or trackball 840 and one or more output devices 850, such as a speaker 852 and a display 854. Other possible output devices (not shown) can include piezoelectric or other haptic output devices. Some devices can serve more than one input/output function. For example, touchscreen 832 and display 854 can be combined in a single input/output device. The mobile device 800 can provide one or more natural user interfaces (NUIs). For example, the operating system 812 or applications 811 can comprise multimedia processing software, such as audio/video player.

A wireless modem 860 can be coupled to one or more antennas (not shown) and can support two-way communications between the processor 810 and external devices, as is well understood in the art. The modem 860 is shown generically and can include, for example, a cellular modem for communicating at long range with the mobile communication network 804, a Bluetooth-compatible modem 864, or a Wi-Fi-compatible modem 862 for communicating at short range with an external Bluetooth-equipped device or a local wireless data network or router. The wireless modem 860 is typically configured for communication with one or more cellular networks, such as a GSM network for data and voice communications within a single cellular network, between cellular networks, or between the mobile device and a public switched telephone network (PSTN).

The mobile device can further include at least one input/output port 880, a power supply 882, a satellite navigation system receiver 884, such as a Global Positioning System (GPS) receiver, sensors 886 such as an accelerometer, a gyroscope, or an infrared proximity sensor for detecting the orientation and motion of device 800, and for receiving gesture commands as input, a transceiver 888 (for wirelessly transmitting analog or digital signals), and/or a physical connector 890, which can be a USB port, IEEE 1394 (FireWire) port, and/or RS-232 port. The illustrated components 802 are not required or all-inclusive, as any of the components shown can be deleted and other components can be added.

The mobile device can determine location data that indicates the location of the mobile device based upon information received through the satellite navigation system receiver 884 (e.g., GPS receiver). Alternatively, the mobile device can determine location data that indicates location of the mobile device in another way. For example, the location of the mobile device can be determined by triangulation between cell towers of a cellular network. Or, the location of the mobile device can be determined based upon the known locations of Wi-Fi routers in the vicinity of the mobile device. The location data can be updated every second or on some other basis, depending on implementation and/or user settings. Regardless of the source of location data, the mobile device can provide the location data to map navigation tool for use in map navigation.

As a client computing device, the mobile device 800 can send requests to a server computing device (e.g., a search server, a routing server, and so forth), and receive map images, distances, directions, other map data, search results (e.g., POIs based on a POI search within a designated search area), or other data in return from the server computing device.

The mobile device 800 can be part of an implementation environment in which various types of services (e.g., computing services) are provided by a computing "cloud." For example, the cloud can comprise a collection of computing devices, which may be located centrally or distributed, that provide cloud-based services to various types of users and devices connected via a network such as the Internet. Some tasks (e.g., processing user input and presenting a user interface) can be performed on local computing devices (e.g., connected devices) while other tasks (e.g., storage of data to be used in subsequent processing, weighting of data and ranking of data) can be performed in the cloud.

Although FIG. 8 illustrates a mobile device 800, more generally, the innovations described herein can be implemented with devices having other screen capabilities and device form factors, such as a desktop computer, a television screen, or device connected to a television (e.g., a set-top box or gaming console). Services can be provided by the cloud through service providers or through other providers of online services. Additionally, since the technologies described herein may relate to audio streaming, a device screen may not be required or used (a display may be used in instances when audio/video content is being streamed to a multimedia endpoint device with video playback capabilities).

Figure 9:
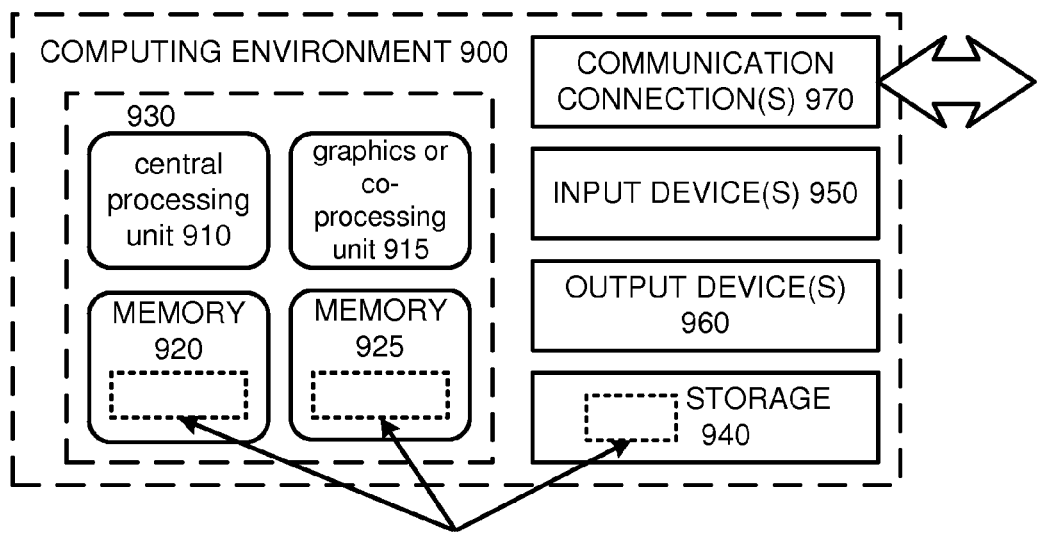
FIG. 9 is a diagram of an example computing system, in which some described embodiments can be implemented.

FIG. 9 is a diagram of an example computing system, in which some described embodiments can be implemented. The computing system 900 is not intended to suggest any limitation as to scope of use or functionality, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may also have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. For video encoding, the input device(s) 950 may be a camera, video card, TV tuner card, or similar device that accepts video input in analog or digital form, or a CD-ROM or CD-RW that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

Figure 10:
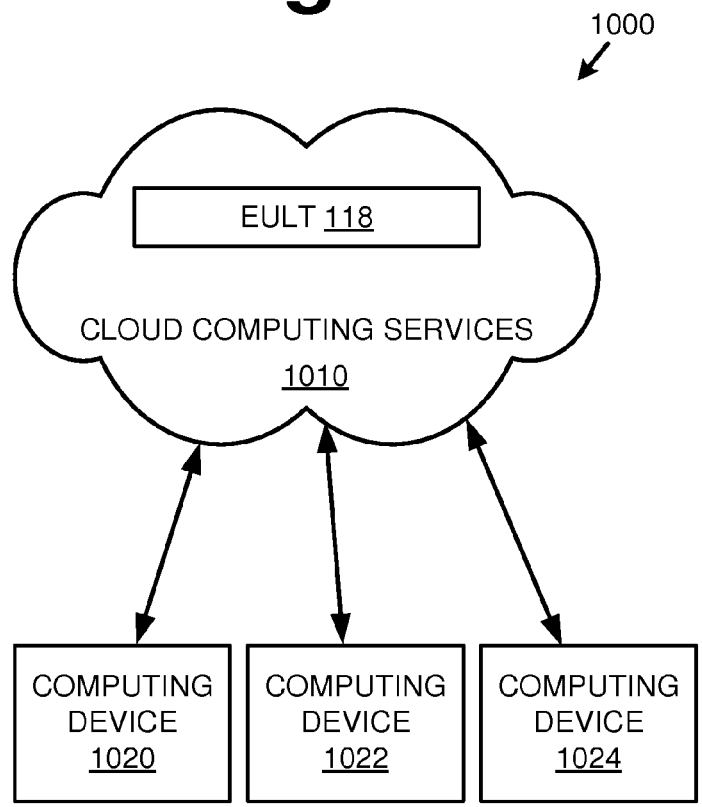
FIG. 10 is an example cloud computing environment that can be used in conjunction with the technologies described herein.

FIG. 10 is an example cloud computing environment that can be used in conjunction with the technologies described herein. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries). Additionally, the cloud computing service 1010 may implement the EULT 118 and other functionalities described herein relating to updating language understanding classifier models The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operations (e.g., data processing, data storage, reactive agent definition generation and editing, and the like).

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 9, computer-readable storage media include memory 920 and 925, and storage 940. The term "computer-readable storage media" does not include signals and carrier waves. In addition, the term "computer-readable storage media" does not include communication connections (e.g., 970).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A server computer, comprising:
   a processing unit; and
   memory coupled to the processing unit;
   the server computer configured to perform operations for updating language understanding classifier models, the operations comprising:
      receiving from at least one computing device of a plurality of computing devices communicatively coupled to the server computer, a first user selection of at least one of the following: at least one intent of a plurality of available intents and/or at least one slot for the at least one intent, wherein:
         the at least one intent is associated with at least one action used to perform at least one function of a category of functions for a domain;
         the at least one slot indicating a value used for performing the at least one action; and
         the first user selection associated with a digital voice input received at the at least one computing device; and
      upon receiving from at least another computing device of the plurality of computing devices, a plurality of subsequent user selections that are identical to the first user selection and a plurality of subsequent digital voice inputs corresponding to the plurality of subsequent user selections, wherein the plurality of subsequent digital voice inputs are substantially similar to the digital voice input:
         generating a labeled data set by pairing the digital voice input with the first user selection;
         selecting a language understanding classifier from a plurality of available language understanding classifiers associated with one or more agent definitions, the selecting based at least on the at least one intent; and
         updating the selected language understanding classifier based on the generated labeled data set.

2. The server computer according to claim 1, the operations further comprising:
   determining a number of the plurality of subsequent user selections; and
   when the number of the plurality of subsequent user selections is higher than a first threshold, automatically updating the selected language understanding classifier based on the generated labeled data set.

3. The server computer according to claim 1, the operations further comprising:
   receiving the digital voice input from the at least one computing device;
   performing natural language processing using the digital voice input to determine a user voice request; and storing one or both of the digital voice input and the user voice request in an utterances database.

4. The server computer according to claim 3, the operations further comprising:
retrieving one or both of the digital voice input and the user voice request from the utterances database;
generating the labeled data set by pairing the first user selection with one or both of the digital voice input and the user voice request; and
storing the generated labeled data set in a labeled data database.

5. The server computer according to claim 1, the operations further comprising:
determining a number of the plurality of subsequent user selections which comprise at least one intent and at least one slot that are different from the at least one intent and the at least one slot of the first user selection.

6. The server computer according to claim 5, the operations further comprising:
when the determined number of the plurality of subsequent user selections is higher than a second threshold, generating a request for manual updating of the selected language understanding classifier by an administrator of the server computer.

7. The server computer according to claim 6, the operations further comprising:
in response to the request for manual updating, receiving input selecting the at least one intent and the at least one slot of the first user selection or the at least one intent and the at least one slot of the plurality of subsequent user selections.

8. The server computer according to claim 7, the operations further comprising:
receiving input updating the selected language understanding classifier based on the selected at least one intent and the at least one slot.

9. A method for updating language understanding classifier models, the method comprising:
receiving via one or more microphones of a computing device, a digital voice input from a user of the computing device;
performing natural language processing using the digital voice input to determine a user voice request;
upon determining the user voice request does not match at least one of a plurality of pre-defined tasks in an agent definition of a digital personal assistant running on the computing device:
receiving using a graphical user interface of an end-user labeling tool (EULT) of the computing device, a user selection of at least one of the following: an intent of a plurality of available intents and at least one slot for the intent, wherein:
the intent is associated with at least one action used to perform at least one function of a category of functions for a domain; and
the at least one slot indicating a value used for performing the at least one action;
generating a labeled data set by pairing the user voice request and the user selection;
selecting a language understanding classifier from a plurality of available language understanding classifiers associated with the agent definition, the selecting based at least on the intent selected by the user; and
updating the selected language understanding classifier based on the generated labeled data set.

10. The method according to claim 9, wherein the plurality of available language understanding classifiers associated with the agent definition are stored in local storage at the computing device and the method further comprises:
associating the updated language understanding classifier with a profile of the user within the computing device; and
storing the updated language understanding classifier in the local storage.

11. The method according to claim 10, further comprising:
designating the updated language understanding classifier as a common resource that can be shared between the digital personal assistant and at least one third-party application running on the computing device.

12. The method according to claim 9, wherein the updating comprises:
replacing an association of the selected language understanding classifier with at least one of a previous intent and/or slot with a new association with at least one of the intent and/or the at least one slot of the user selection.

13. The method according to claim 12, further comprising:
creating an association of the selected language understanding classifier with one or both of the digital voice input and the user voice request.

14. The method according to claim 9, wherein the user selection comprises the intent, and the method further comprises:
selecting the at least one slot automatically, based on the intent and the user voice request.

15. The method according to claim 9, wherein the agent definition comprises at least one of a voice command definition (VCD) schema and a reactive agent definition (RAD) schema associated with the digital personal assistant.

16. A computer-readable storage medium storing computer-executable instructions for causing a computing device to perform operations for updating language understanding classifier models, the operations comprising:
determining a user request based on user input received at a computing device, the user request received via at least one of text input and voice input, the request for a functionality of a digital personal assistant running on the computing device;
determining the user request does not match at least one of a plurality of pre-defined voice commands in an agent definition of the digital personal assistant;
generating a confidence score by applying a plurality of available language understanding classifiers associated with the agent definition to the user request;
upon determining that the confidence score is less than a threshold value:
receiving using a graphical user interface of an end-user labeling tool (EULT) of the computing device, a user selection of at least one of the following: at least one intent of a plurality of available intents and at least one slot for the at least one intent, wherein:
the at least one intent is associated with at least one action used to perform at least one function of a category of functions for a domain; and
the at least one slot indicating a value used for performing the at least one action;
generating a labeled data set by pairing the user voice request and the user selection;
selecting a language understanding classifier from the plurality of available language understanding classifiers associated with the agent definition, the selecting based at least on the at least one intent selected by the user; and generating an updated language understanding classifier by training the selected language understanding classifier using the generated labeled data set.

17. The computer-readable storage medium according to claim 16, the operations further comprising:

receiving using the graphical user interface of the end-user labeling tool (EULT) of the computing device, a selection of the domain associated with the at least one intent.

18. The computer-readable storage medium according to claim 16, the operations further comprising:

during the training, associating the selected language understanding classifier with the user request, the at least one intent and the at least one slot of the user selection.

19. The computer-readable storage medium according to claim 16, wherein the agent definition comprises at least one of a voice command definition (VCD) schema and a reactive agent definition (RAD) schema associated with the digital personal assistant.

* * * * *